United States Patent
Tsuie (10) Patent No.: US 7,319,659 B2
(45) Date of Patent: Jan. 15, 2008

(54) OFDM RECEIVER, MODE DETECTOR THEREFOR, AND METHOD FOR PROCESSING OFDM SIGNALS

(75) Inventor: Yih-Ming Tsuie, Hsinchu (TW)

(73) Assignee: Silicon Integrated System Corp., Hsinchu (TW)

(*) Notice: Subject to any disclaimer, the term of this patent is extended or adjusted under 35 U.S.C. 154(b) by 994 days.

(21) Appl. No.: 10/421,726

(22) Filed: Apr. 24, 2003

(65) Prior Publication Data

US 2004/0213194 A1    Oct. 28, 2004

(51) Int. Cl.
*H04J 11/00* (2006.01)
(52) U.S. Cl. .............. 370/203; 370/208; 370/335; 375/260; 708/5; 708/200; 708/400
(58) Field of Classification Search .......... 370/342, 370/205, 215, 372, 533, 545
See application file for complete search history.

(56) References Cited

U.S. PATENT DOCUMENTS 5,787,123 A * 7/1998 Okada et al. ............... 375/324
6,108,353 A * 8/2000 Nakamura et al. .......... 370/504
6,330,293 B1 * 12/2001 Klank et al. ................ 375/344

* cited by examiner

*Primary Examiner*—Kenneth Vanderpuye
*Assistant Examiner*—Salvador E. Rivas
(74) *Attorney, Agent, or Firm*—Birch, Stewart, Kolasch & Birch, LLP (57) ABSTRACT

A method of mode detection for OFDM signals. The method comprises the steps of delaying the OFDM signal for a first and second number of samples, multiplying the two delayed signals by coefficient signals, and deriving a sum of the two products, deriving an error signal by subtracting the sum of the two products from the OFDM signal, extracting amplitudes of the coefficient signals, and accordingly deriving step size signals, updating the coefficient signals according to the error signal and step size signals, detecting edges of the amplitudes of the coefficient signals, and determining the guard interval length and transmission mode according to the detected edges.

12 Claims, 8 Drawing Sheets

OFDM RECEIVER, MODE DETECTOR THEREFOR, AND METHOD FOR PROCESSING OFDM SIGNALS

BACKGROUND OF THE INVENTION

1. Field of the Invention

The present invention relates to an OFDM receiver and particularly to a method of mode detection for OFDM signals in a DVB-T receiver.

2. Description of the Prior Art

OFDM is a multi-channel modulation system employing Frequency Division Multiplexing (FDM) of orthogonal sub-carriers, each modulated by a low bit-rate digital stream.

In older multi-channel systems using FDM, the total available bandwidth is divided into N non-overlapping frequency sub-channels. Each sub-channel is modulated with a separate symbol stream and the N sub-channels are frequency multiplexed. Even though the prevention of spectral overlapping of sub-carriers reduces (or eliminates) Inter-channel Interference, this leads to an inefficient use of spectrum. The guard bands on either side of each sub-channel waste precious bandwidth. To overcome the problem of bandwidth wastage, alternatively, N overlapping (but orthogonal) sub-carriers, each carrying a baud rate of 1/T and spaced 1/T apart can be used. Because of the frequency spacing selected, the sub-carriers are all mathematically orthogonal to each other. This permits the proper demodulation of the symbol streams without requiring non-overlapping spectra. Another way of specifying the sub-carrier orthogonality is to require that each sub-carrier have an exact integer number of cycles in the interval T. The modulation of these orthogonal sub-carriers can be represented as an Inverse Fourier Transform. Alternatively, a DFT operation followed by low-pass filtering can generate the OFDM signal. It must be noted that OFDM can be used either as a modulation or multiplexing technique.

The use of Discrete Fourier Transform (DFT) in the parallel transmission of data using Frequency Division Multiplexing was investigated in 1971 by Weinstein and Ebert. In a data sequence $d_0, d_2, \ldots, d_{N-1}$, where each $d_n$ is a complex symbol (the data sequence can be the output of a complex digital modulator, such as QAM, PSK etc), when performing an IDFT on the sequence 2dn (the factor 2 is used purely for scaling purposes), N complex numbers Sm (m=0, 1 . . . , N−1) result, as:

$$S_m = 2\sum_{n=0}^{N-1} d_n \exp\left(j2\pi\frac{nm}{N}\right) = 2\sum_{n=0}^{N-1} d_n \exp(j2\pi f_n t_m) \quad (2.1)$$

[m = 0, 1, ... N − 1] Where, $$f_n = \frac{n}{NT_s} \text{ and } t = mT_s \quad (2.2)$$

Where, $T_s$ represents the symbol interval of the original symbols. Passing the real part of the symbol sequence represented by equation (2.1) thorough a low-pass filter with each symbol separated by a duration of $T_s$ seconds, yields the signal, $$y(t) = 2\text{Re}\left\{\sum_{n=0}^{N-1} d_n \exp\left(j2\pi\frac{n}{T}t\right)\right\}, \text{ for } 0 \leq t \leq T \quad (2.3)$$

Where T is defined as $NT_s$. The signal y( represents the baseband version of the OFDM signal.

It can be noted from (2.3) that the length of the OFDM signal is T, the spacing between the carriers is equal to 1/T, the OFDM symbol-rate is N times the original baud rate, there are N orthogonal sub-carriers in the system, and the signal defined in equation (2.3) is the basic OFDM symbol.

One of the main advantages of OFDM is its effectiveness against the multi-path delay spread frequently encountered in mobile communication channels. The reduction of the symbol rate by N times results in a proportional reduction of the relative multi-path delay spread, relative to the symbol time. To completely eliminate even the very small ISI that results, a guard time is introduced for each OFDM symbol. The guard time must be chosen to be larger than the expected delay spread, such that multi-path components from one symbol cannot interfere with the next symbol. Leaving the guard time empty may lead to inter-carrier interference (ICI), since the carriers are no longer orthogonal to each other. To avoid such crosstalk between sub-carriers, the OFDM symbol is cyclically extended in the guard time. This ensures that the delayed replicas of the OFDM symbols always have an integer number of cycles within the FFT interval as long as the multi-path delay spread is less than the guard time.

Figure 9:
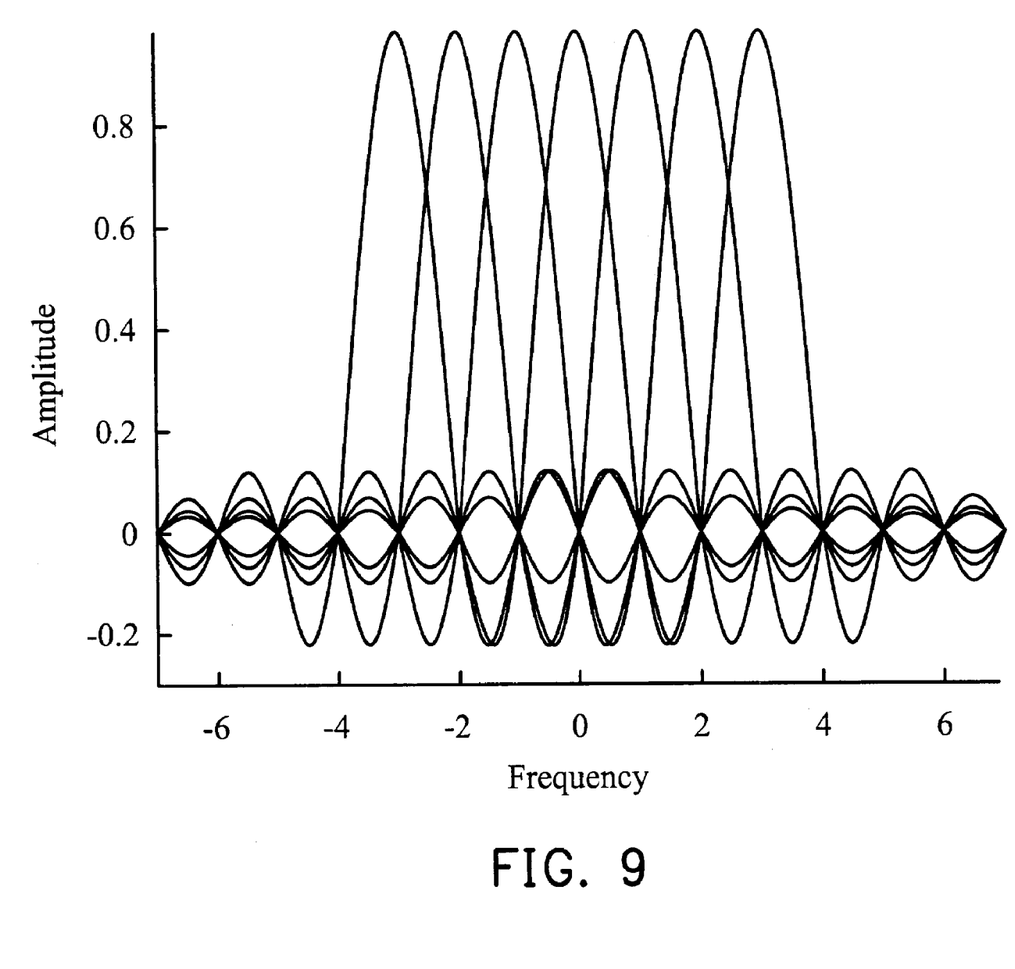
FIG. 9 is a diagram showing power spectral density of the OFDM signal.

If the ODFM symbol is generated using equation (2.3), the power spectral density of this signal is similar to that shown in FIG. 9. The sharp-phase transitions caused by phase modulation result in very large side-lobes in the PSD and the spectrum falls off rather slowly (according to a sinc function). If the number of sub-carriers increases, the spectrum roll-off is sharper in the beginning, but moves further away at frequencies from the 3-dB cut-off frequency. To overcome this problem of slow spectrum roll-off, a windowing may be used to reduce the side-lobe level. The most commonly used window is the Raised Cosine Window given by:

$$w(t) = \begin{cases} 0.5 + 0.5\cos(\pi + \pi t/(\beta T_r)), & \ldots 0 \leq t \leq \beta T_r \\ 1.0, & \ldots \beta T_s \leq t \leq T_r \\ 0.5 + 0.5\cos((t - T_r)\pi/\beta T_r)), & \ldots T_s \leq t \leq (1 + \beta)T_r \end{cases}$$

Here $T_r$ is the symbol interval chosen to be shorter than the actual OFDM symbol duration, since the symbols are allowed to partially overlap in the roll-off region of the raised cosine window. Incorporating the windowing effect, the OFDM symbol can now be represented as:

$$y(t) = 2\text{Re}\left\{w(t)\sum_{n=0}^{N-1} d_n \exp\left(j2\pi\frac{n}{T}t\right)\right\}, \text{ for } 0 \leq t \leq T$$

It must be noted that filtering can also be used as a substitute for windowing, for tailoring the spectrum roll-off. Windowing, though, is preferred to filtering because it can be carefully controlled. With filtering, rippling effects in the roll-off region of the OFDM symbol must be avoided.

Rippling causes distortions in the OFDM symbol, which directly leads to less-delay spread tolerance.

Based on the previous discussions, the method for generating an ODFM symbol is as follows.

First, the N input complex symbols are padded with zeros to get $N_s$ symbols to calculate the IFFT. The output of the IFFT is the basic OFDM symbol.

Based on the delay spread of the multi-path channel, a specific guard-time must be chosen (e.g. $T_g$). A number of samples corresponding to this guard time must be taken from the beginning of the OFDM symbol and appended to the end of the symbol. Likewise, the same number of samples must be taken from the end of the OFDM symbol and inserted at the beginning.

The OFDM symbol must be multiplied by the raised cosine window to remove the power of the out-of-band sub-carriers.

The windowed OFDM symbol is then added to the output of the previous OFDM symbol with a delay of $T_r$, so that there is an overlap region of $\beta T_r$ between each symbol.

OFDM system design, as in any other system design, involves tradeoff and conflicting requirements. The following are the most important design parameters of an OFDM system and may form part of a general OFDM system specification: Bit Rate required for the system, Bandwidth available, BER requirements (Power efficiency) and RMS delay spread of the channel.

Guard Time

Guard time in an OFDM system usually results in an SNR loss in an OFDM system, since it carries no information. The choice of the guard time is straightforward once the multi-path delay spread is known. As a rule of thumb, the guard time must be at least 2-4 times the RMS delay spread of the multi-path channel. Further, higher-order modulation schemes (like 32 or 64 QAM) are more sensitive to ISI and ICI than simple schemes like QPSK. This factor must also be taken into account when determining the guard-time.

Symbol Duration

To minimize SNR loss due to guard time, symbol duration must be set much higher than guard time. An increase in symbol time, however, implies a corresponding increase in the number of sub-carriers and thus an increase in the system complexity. A practical design choice for symbol time requires at least five times the guard time, which leads to an acceptable SNR loss.

Number of Sub-carriers

Once the symbol duration is determined, the number of sub-carriers required can be determined by first calculating the sub-carrier spacing buy simply inverting the symbol time (less the guard period). The number of sub-carriers is the available bandwidth divided by the sub-carrier spacing.

Modulation and Coding Choices

The first step in selecting coding and modulation techniques is to determine the number of bits carried by an OFDM symbol. Then, a suitable combination of modulation and coding techniques can be selected to fit the input data rate into the OFDM symbols and, at the same time, satisfying the bit-error rate requirements. Selection of modulation and coding techniques is now simplified, since each channel is assumed to almost AWGN and there is no requirement for consideration of the effects of multi-path delay spread.

OFDM possesses inherent advantages for wireless communications.

As discussed earlier, the increase in the symbol time of the OFDM symbol by N times (N being the number of sub-carriers), leads to a corresponding increase in the effectiveness of OFDM against the ISI caused due to multi-path delay spread. Further, use of the cyclic extension process and proper design can completely eliminate ISI from the system.

In addition to delay variations in the channel, the lack of amplitude flatness in the frequency response of the channel also causes ISI in digital communication systems. A typical example would be twister-pair cable use in telephone lines. These transmission lines handle voice calls and have a poor frequency response when it comes to high frequency transmission. In systems that use single-carrier transmission, an equalizer may be required to mitigate the effect of channel distortion. The complexity of the equalizer depends upon the severity of the channel distortion and there are frequently issues such as equalizer non-linearities and error propagation etc., that cause additional trouble.

In OFDM systems, on the other hand, since the bandwidth of each sub-carrier is very small, the amplitude response over this narrow bandwidth will be basically flat (of course, it can be safely assumed that the phase response will be linear over this narrow bandwidth). Even in the case of extreme amplitude distortion, an equalizer of very simple structure will be enough to correct the distortion in each sub-carrier.

The use of sub-carrier modulation improves the flexibility of OFDM to channel fading and distortion makes it possible for the system to transmit at maximum possible capacity using the technique of channel loading. If the transmission channel has a fading notch in a certain frequency range corresponding to a certain sub-carrier, the presence of this notch can be detected using channel estimation schemes, and assuming that the notch does not vary fast enough compared to the symbol duration of the OFDM symbol, it is possible to change (scale down/up) the modulation and coding schemes for this particular sub-carrier (i.e., increase their robustness against noise), so that capacity as a whole is maximized over all the sub-carriers. However, this requires the data from channel-estimation algorithms. In the case of single-carrier systems, nothing can be performed against such fading notches. They must somehow survive the distortion using error correction coding or equalizers.

Impulse noise usually comprises a burst of interference in channels such as the return path HFC (Hybrid-Fiber-Coaxial), twisted-pair and wireless channels affected by atmospheric phenomena such as lightning etc. It is common for the length of the interference waveform to exceed the symbol duration of a typical digital communication system. For example, in a 10 MBPS system, the symbol duration is 0.1 μs, and an impulse noise waveform, lasting for a couple of micro-seconds, can cause a burst of errors that cannot be corrected using normal error-correction coding. Usually complicated Reed-Solomon codes in conjunction with huge interleaves are used to correct this problem. OFDM systems are inherently robust against impulse noise, since the symbol duration of an OFDM signal is much larger than that of the corresponding single-carrier system and thus, it is less likely that impulse noise will cause (even single) symbol errors. Thus, complicated error-control coding and interleaving schemes for handling burst-type errors are not really required for OFDM Systems simplifying the transceiver design.

OFDM is the best environment in which to employ frequency diversity. In fact, in a combination of OFDM and CDMA, called MC-CDMA transmission, frequency diversity is inherently present in the system (i.e., it is freely available). Even though OFDM provides advantages for wireless transmission, it has a few serious disadvantages that must be overcome for this technology to become a success.

Many applications that use OFDM technology have arisen in the last few years. In the following, one such application is described in detail.

Digital Video Broadcasting (DVB) is a standard for broadcasting Digital Television over satellite, cable, and terrestrial (wireless) transmission.

DVB-T is the system specification for the terrestrial broadcast of digital television signals. DVB-T was approved by the DVB Steering Board in December 1995. This work was based on a set of user requirements produced by the Terrestrial Commercial Module of the DVB project. DVB members contributed to the technical development of DVB-T through the DTTV-SA (Digital Terrestrial Television-Systems Aspects) of the Technical Module. The European Projects SPECTRE, STERNE, HD-DIVINE, HDTVT, dTTb, and several other organizations developed system hardware and produced test results that were fed back to DTTV-SA.

As with the other DVB standards, MPEG-2 audio and video coding forms the payload of DVB-T. Other elements of the specification include a transmission scheme based on orthogonal frequency-division multiplexing (OFDM), which allows for the use of either 1705 carriers (usually known as 2k), or 6817 carriers (8k). Concatenated error correction is used. The 2k mode is suitable for single-transmitter operation and for relatively small single-frequency networks with limited transmitter power. The 8k mode can be used both for single-transmitter operation and for large-area single-frequency networks. The guard interval is selectable. As well, Reed-Solomon outer coding and outer convolutional interleaving are used, as with the other DVB standards, and another error-correction system, using a punctured convolutional code, is added. This second error-correction system, the inner code, can be adjusted (in the amount of overhead) to suit the needs of the service provider. The data carriers in the coded orthogonal frequency-division multiplexing (COFDM) frame can use QPSK and different levels of QAM modulation and code rates to trade bits for ruggedness. Bi-level hierarchical channel coding and modulation can be used, but hierarchical source coding is not used. The latter was deemed unnecessary by the DVB group because its benefits did not justify the extra receiver complexity. Finally, the modulation system combines OFDM with QPSK/QAM. OFDM uses a large number of carriers that spread the information content of the signal. Used successfully in DAB (digital audio broadcasting), OFDM's major advantage is its resistance to multi-path.

Improved multi-path immunity is obtained through the use of a guard interval, a portion of the digital signal given away for echo resistance. This guard interval reduces the transmission capacity of OFDM systems. However, the greater the number of OFDM carriers provided, for a given maximum echo time delay, the less transmission capacity is lost. Nonetheless, a tradeoff is involved. Simply increasing the number of carriers has a significantly detrimental impact on receiver complexity and phase-noise sensitivity.

Because of the multi-path immunity of OFDM, it may be possible to operate an overlapping network of transmitting stations with a single frequency. In the areas of overlap, the weaker of the two received signals is similar to an echo signal. However, if the two transmitters are far apart, causing a large time delay between the two signals, the system will require a large guard interval.

The potential exists for three different operating environments for digital terrestrial television in Europe, including broadcast on a currently unused channel, such as an adjacent channel, or on a clear channel; broadcast in a small-area single-frequency network (SFN); or broadcast in a large-area SFN.

One of the main challenges for the DVB-T developers is that the different operating environments lead to somewhat different optimum OFDM systems. The common 2k/8k specification has been developed to offer solutions for all (or nearly all) operating environments.

It should be noted that, in the DVB-T system, the ratio of guard interval Tg over the wanted symbol interval Tu may be 1/32, 1/16, 1/8 and 1/4, and Tu is respectively 2048 and 8192 in the 2K-mode and 8K-mode transmission. Thus, in order to recover the original information carried in an OFDM signal received from an OFDM transmitter, the values of Tu and Tg must be known before implementing guard interval removal and discrete Fourier transform. A mode detection mechanism is required in the DVB-T receiver.

In U.S. Pat. No. 6,330,293, Otto Klank et al. disclose a mode detection method. At the receiver end, coarse time synchronization linked to mode detection and, possibly and additionally, coarse AFC (automatic frequency correction) are carried out initially both for seeking and identifying received signals, as well as for continuously monitoring them. The time signal is correlated with the time signal shifted by the wanted symbol length Tu. This correlation may be carried out more than once, for example five times per data frame. In this correlation, signal samples of different length Tu are used, depending on the respective mode, and the correlation result maxima obtained from this are then used to deduce the present mode (for example 2K or 8K modes). If no usable correlation result maximum is obtained, the correlation steps may be repeated.

However, the mode detection using only correlation result maxima is susceptible to noise. Further, the correlation steps are repeated until any usable correlation result maxima is obtained, which implies a time-consuming calculation. This is not an efficient detection method.

Figure 1:
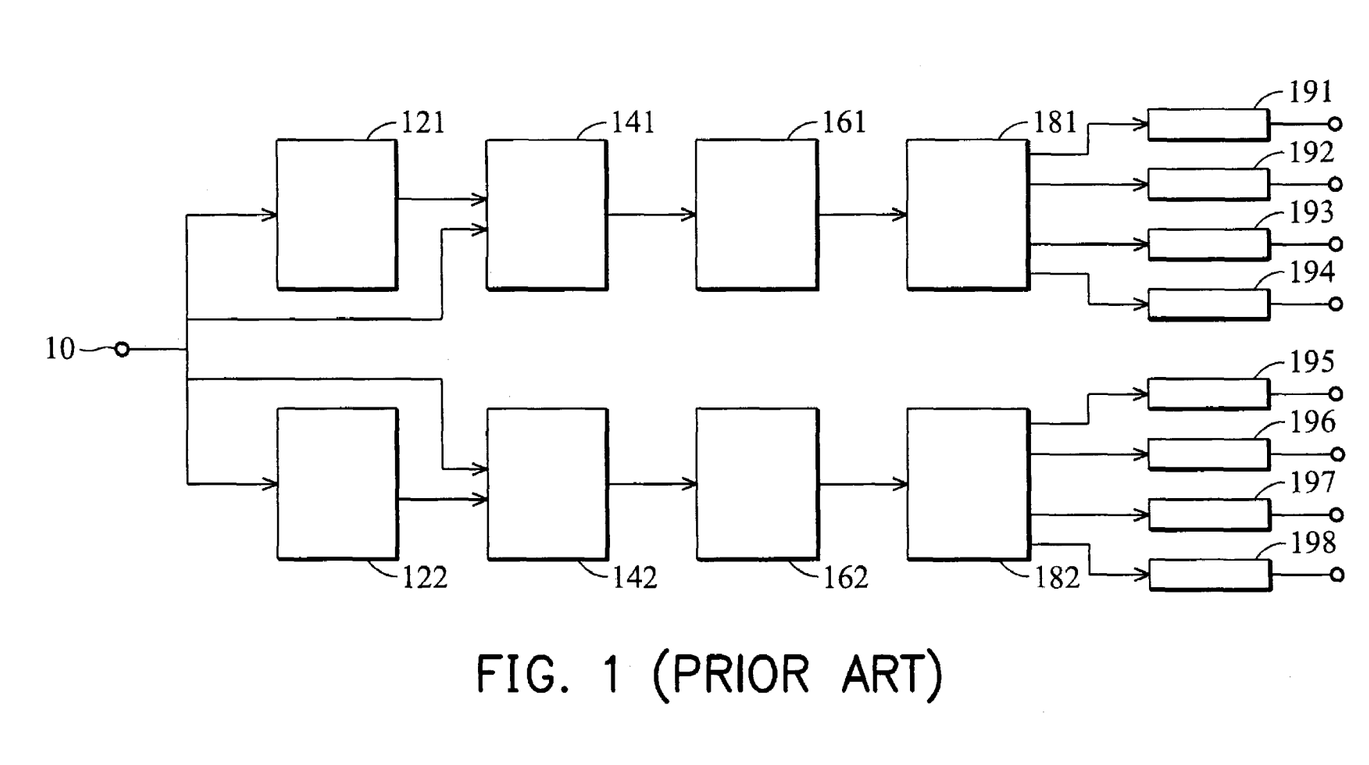
FIG. 1 is a diagram showing a conventional mode detector.

FIG. 1 is a diagram showing a mode detector disclosed in U.S. patent application publication No. 2002/0186791. The I and Q samples of the received signal are supplied to an input terminal 10. The samples are supplied to a 2k and 8k size first-in first-out (FIFO) memory 121 and 122. The moving average correlation of the samples over a minimum guard period is then calculated in blocks 141 and 142, and the power of the correlation measured in blocks 161 and 162. The correlation function is calculated in blocks 141 and 142 by multiplying input symbols with symbols contemporaneously obtained from the delay blocks 121 and 122 with the delay applied thereto, thereby obtaining a measure of the correlation between them. The results are then summed, and a running average is calculated over a number of samples, equal to the smallest allowed guard interval size, that is, {fraction (1/32)} of the FFT size. Thus, for example, g=64 and 256 samples in 2k and 8k mode respectively. Each combination of the blocks 141 and 161, and 142 and 162 therefore forms a correlation function, and the separation between peaks in each correlation function depends on the total duration of the symbol plus the guard period. The resulting measurements are passed to blocks 181 and 182 for decimation (i.e., removal of some portion of the samples). The samples remaining after decimation in blocks 181 and 182 are then passed through filtering resonators 191-198, each centered at a respective resonance frequency based on the COFDM symbol frequency of a particular combination of the mode and the guard interval. A counter (not shown) is provided at the output of each of the resonators 191-198, and each counter increments when its peak power is largest. The peak powers produced by each resonator are then compared. Thus, by examining the counter values after a number of symbols, the counter with the highest value is determined to be that which corresponds to the mode (either 2k or 8k) and guard period used by the transmitted signal.

However, the use of correlation function is time-consuming and increases the circuit complexity.

SUMMARY OF THE INVENTION

The object of the present invention is to provide a simpler and more efficient method and apparatus for mode detection of the DVB-T signal.

The present invention provides a method for processing a RF OFDM signal transmitted from an OFDM transmitter. The method includes the steps of receiving and converting the RF OFDM signal into an IF OFDM signal, converting the IF OFDM signal into a digital OFDM signal, detecting a transmission mode and guard interval length of the OFDM signal, implementing digital processing of the OFDM signal in time domain and frequency domain, and implementing channel decoding and de-interleaving of the OFDM signal, wherein the mode detection includes the steps of delaying the OFDM signal for a first and second number of samples, multiplying the two delayed signals by coefficient signals, and deriving a sum of the two products, deriving an error signal by subtracting the sum of the two products from the OFDM signal, extracting amplitudes of the coefficient signals, and accordingly deriving step size signals, updating the coefficient signals according to the error signal and step size signals, detecting edges of the amplitudes of the coefficient signals, and determining the guard interval length and transmission mode according to the detected edges.

The present invention provides another method for processing a RF OFDM signal transmitted from an OFDM transmitter. The method is similar to the previously described method except for the mode detection step. The mode detection step includes the steps of delaying the OFDM signal for a first and second number of samples, multiplying the OFDM signal and the OFDM signal delayed for the first number of samples with coefficient signals, and deriving a sum of the two products, deriving an error signal by subtracting the sum of the two products from the OFDM signal delayed for the second number of samples, extracting amplitudes of the coefficient signals, and accordingly deriving step size signals, updating the coefficient signals according to the error signal and step size signals, detecting edges of the amplitudes of the coefficient signals, and determining the guard interval length and transmission mode according to the detected edges.

The present invention further provides an OFDM receiver including a front end receiving and converting the RF OFDM signal into an IF OFDM signal, an A/D converter converting the IF OFDM signal into a digital OFDM signal, a mode detector detecting a transmission mode and guard interval length of the OFDM signal, frequency and time domain digital processors implementing digital processing of the OFDM signal in time domain and frequency domain, and a channel decoder and de-interleaver implementing channel decoding and de-interleaving of the OFDM signal, wherein the mode detector includes delay units delaying the OFDM signal for a first and second number of samples, multipliers multiplying the two delayed signals by coefficient signals, a first adder deriving a sum of the two products from the multipliers, a second adder deriving an error signal by subtracting the sum of the two products from the OFDM signal, an amplitude extractor extracting amplitudes of the coefficient signals, a step-size adjustment circuit generating step size signals according to the amplitudes from the amplitude extractor, a correction term calculator updating the coefficient signals according to the error signal and step size signals, an edge detector detecting edges of the amplitudes of the coefficient signals, and a discriminator determining the guard interval length and transmission mode according to the detected edges.

The present invention also provides another OFDM receiver similar to the previously described receiver except for the mode detector. The mode detector includes delay units delaying the OFDM signal for a first and second number of samples, multipliers multiplying the OFDM signal and the OFDM signal delayed for the first number of samples with coefficient signals, a first adder deriving a sum of the two products from the multipliers, a second adder deriving an error signal by subtracting the sum of the two products from the OFDM signal delayed for the second number of samples, an amplitude extractor extracting amplitudes of the coefficient signals, a step-size adjustment circuit generating step size signals according to the amplitudes from the amplitude extractor, a correction term calculator updating the coefficient signals according to the error signal and step size signals, an edge detector detecting edges of the amplitudes of the coefficient signals, and a discriminator determining the guard interval length and transmission mode according to the detected edges.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 2:
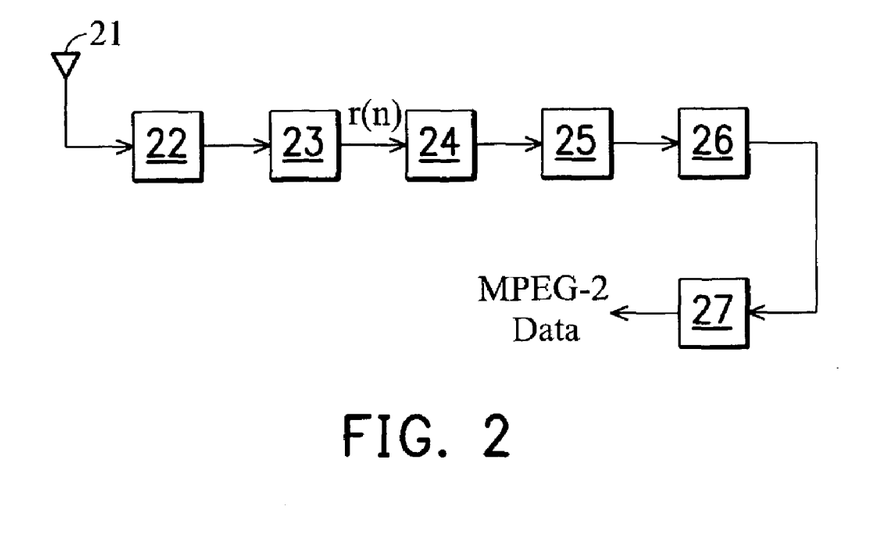
FIG. 2 is a functional block diagram of an OFDM receiver according to one embodiment of the invention.

FIG. 2 is a functional block diagram of an OFDM receiver according to one embodiment of the invention. The OFDM receiver 2 includes an antenna 21, a front end 22, A/D converter 23, mode detector 24, time-domain digital signal processor 25, frequency-domain digital signal processor 26 and channel decoder and de-inter-leaver 27.

The antenna 21 receives a radio frequency (RF) signal from an OFDM transmitter (not shown). The RF signal received by the antenna 21 is an OFDM modulated signal carrying OFDM symbols. The OFDM receiver 2 performs a receiving process for the OFDM symbols.

The front end 22 typically includes a RF tuner converting the received RF signal in frequency to an intermediate frequency band (IF) signal, amplifying it, and applying it to the A/D converter 23.

The digital signal r(n) from the A/D converter 23 is sent to the mode detector 24 for detection of the transmission mode of the OFDM signal. The mode detector 24 will be described in detail later.

After the mode detection, the digital OFDM signal is sent to the time-domain digital processor 25 and then to frequency-domain digital processor 26. Through the time and frequency domain processor 25 and 26, the OFDM signal is mixed down to baseband signal, synchronized, with cyclic prefix removed, FFT applied to, and the channels being estimated and equalized. The cyclic prefix removal, synchronization and channel estimation are explained in the following.

The cyclic prefix in the OFDM signal is removed before implementation of FFT. The cyclic prefix is used to completely eliminate the inter-symbolic interference. A guard time larger than the expected delay spread is chosen such that multi-path components from one symbol cannot interfere with the next symbol, wherein the cyclic prefix is located. This guard time may be no signal at all, in which case the problem of inter-carrier interference (ICI) arises. Then, the OFDM symbol is cyclically extended in the guard time. Using this method, the delay replicas of the OFDM symbol always have an integer number of cycles within the FFT interval, as long as the delay is smaller than the guard time. Multi-path signals with delays smaller than the guard time cannot cause ICI.

Synchronization is a major hurdle in OFDM. Synchronization usually consists of three parts:
1. Frame detection
2. Carrier frequency offset estimation and correction
3. Sampling error correction Frame detection determines the symbol boundary so that correct samples for a symbol frame can be taken. Due to the carrier frequency difference between the transmitter and receiver, each signal sample at time t contains an unknown phase factor where $\Delta fc$ is the unknown carrier frequency offset. This unknown phase factor must be estimated and compensated for each sample before FFT at the receiver since otherwise the orthogonality between sub-carriers are lost. For example, when the carrier is at 5 GHz, a 100 ppm crystal offset corresponds to a frequency offset of 50 kHz. For a symbol period of T=3.2 μs, $\Delta fc$ T=1.6.

The synchronized signal after FFT is input to a channel estimator. The channel estimation is performed by inserting pilot tones into each OFDM symbol. The first one, block type pilot channel estimation, has been developed under the assumption of slow fading channel. Even with decision feedback equalizer, this assumes that the channel transfer function is not changing very rapidly. The estimation of the channel for this block-type pilot arrangement can be based on Least Square (LS) or Minimum Mean-Square (MMSE). The MMSE estimate has been shown to give 10-15 dB gain in signal-to-noise ratio (SNR) for the same mean square error of channel estimation over LS estimate. The second, the comb-type pilot channel estimation, has been introduced to satisfy the need for equalizing when the channel changes from even one OFDM block to the subsequent one. The comb-type pilot channel estimation consists of algorithms to estimate the channel at pilot frequencies and to interpolate the channel.

After the digital processors 25 and 26, the OFDM signal is sent to the channel decoder and de-interleaver 27. In a DVB-T transmitter, the generation of the OFDM signal includes steps of transport multiplex adaptation and randomization for energy dispersal, outer coding and outer interleaving, inner coding, inner interleaving, and signal constellations and mapping. Thus, at the receiver end, in order to recover the OFDM signal, corresponding inverse steps must be implemented by the channel decoder and de-interleaver 27.

Finally, the data, such as MPEG-2 data, carried on the OFDM signal is derived.

The mode detector 24 will be described in the following.

Design of the mode detector 24 is based on the concepts of adaptive system identification and edge detection. For clarity, the present mode, which the transmitter actually adopts, is assumed to be 2048 or 2k mode. All the following descriptions are based on this assumption.

Figure 3:
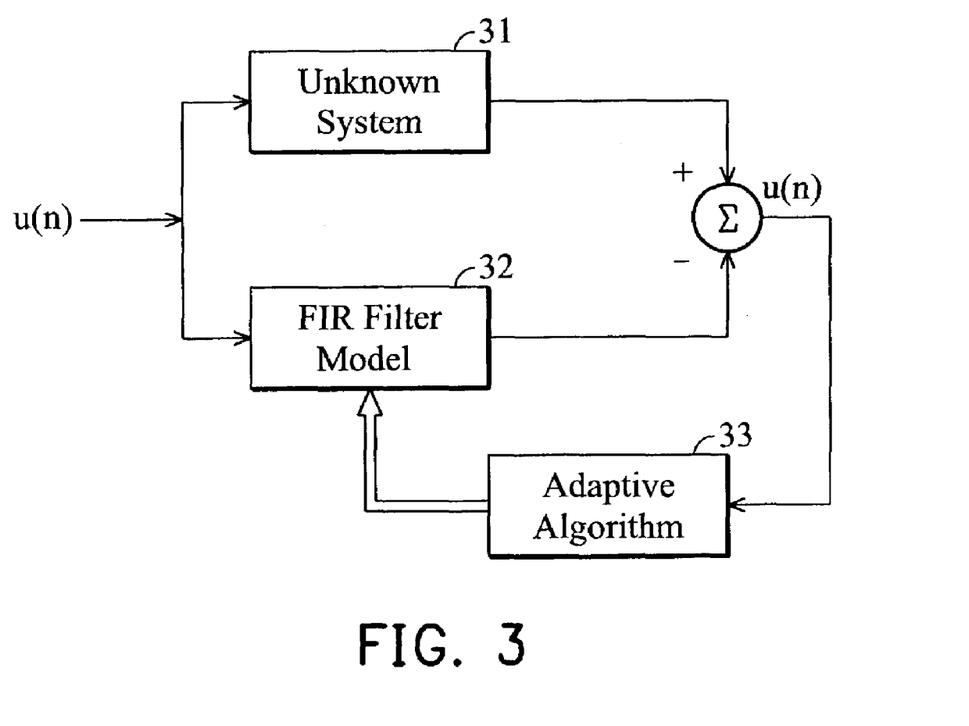
FIG. 3 shows a block diagram of the system identification model.

FIG. 3 shows a block diagram of the system identification model. The unknown system 31 is modeled by an FIR filter 32 with adjustable coefficients. Both the unknown time-variant system 31 and FIR filter model 32 are excited by an input sequence u(n). The output y(n) of the adaptive FIR filter 32 is compared with the output d(n) of the unknown system 31 to produce an estimation error e(n). The estimation error represents the difference between the unknown system output and the model (estimated) output. The estimation error e(n) is then used as the input to an adaptive control algorithm 33 which corrects the individual tap weights of the filter 32. This process is repeated through several iterations until the estimation error e(n) becomes sufficiently small in some statistical sense. The resultant response of the FIR filter 32 now represents that of the unknown system 31. Two embodiments of the system identifiers applied in the present invention are shown in FIGS. 5A and 5B, and will be explained later.

Figure 4A:
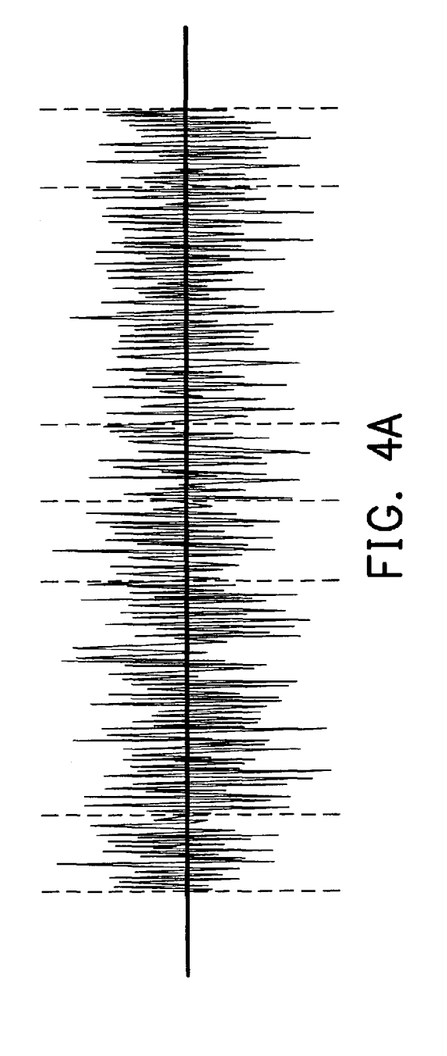
FIG. 4A shows a real part of a segment in the time-domain sample sequence r(n) in FIG. 2 derived from ideal reception.

FIG. 4A shows the real part of a segment in the time-domain sample sequence r(n) in FIG. 2 derived from ideal reception. This segment contains 2Ts data samples. From FIG. 4A, two kinds of situations should be discussed. In the first case, when r(n) is located in the guard interval, it represents that r(n) is the replica of r(n+2K). According to this relationship, this is tantamount to the target FIR filter 32 in FIG. 3 being nothing but a pure delay of 2K sample durations. When the embodiments in FIGS. 5A and 5B are applied, it can be seen that the converged value of $h_0(n)$ will be around 1. Since r(n) is uncorrelated with r(n+8K), the converged value of $h_1(n)$ will be around 0. In the second case, when r(n) is not located in the guard interval, both $h_0(n)$ and $h_1(n)$ will converge to 0 since the tap contents corresponding to $h_0(n)$ and $h_1(n)$ are uncorrelated with r(n). The curves of the amplitudes versus time index of $h_0(n)$ and $h_1(n)$ are shown in FIG. 4B.

Figure 4B:
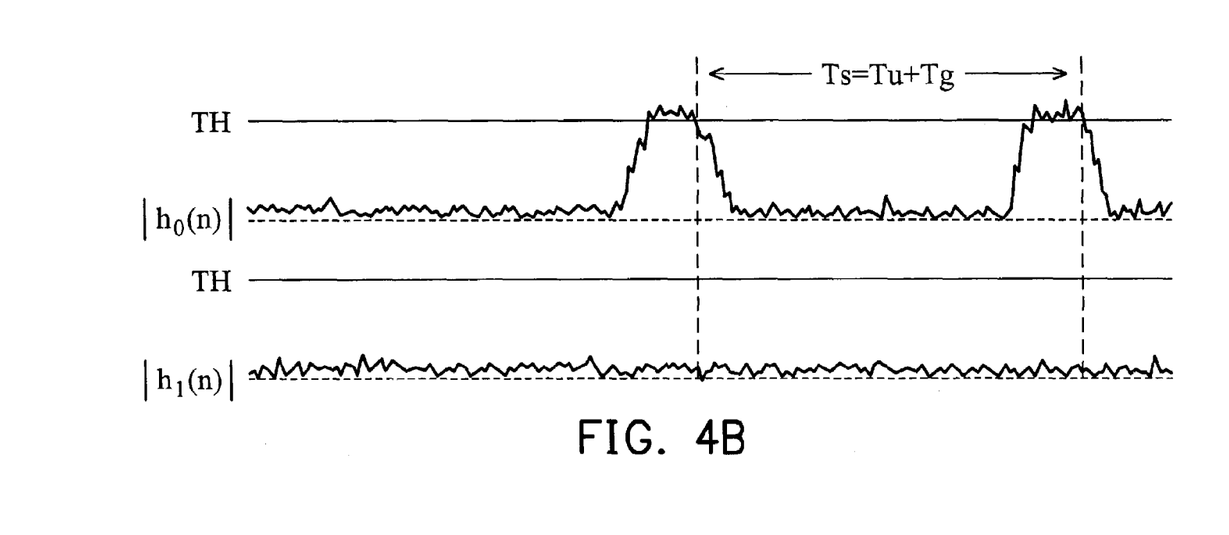
FIG. 4B shows the curves of the amplitudes versus time index of $h_0(n)$ and $h_1(n)$.

Comparing the curves shown in FIG. 4B, it can be seen that the amplitude curve of one of the identifier's coefficients, which, in the example, is designated as h0(n) and corresponds to 2K mode, exhibits periodic plateaus. The duration between two consecutive plateaus is Ts=Tu+Tg. Therefore, the system parameters Tu and Tg can be judged from the duration between the plateaus.

Figure 5A:
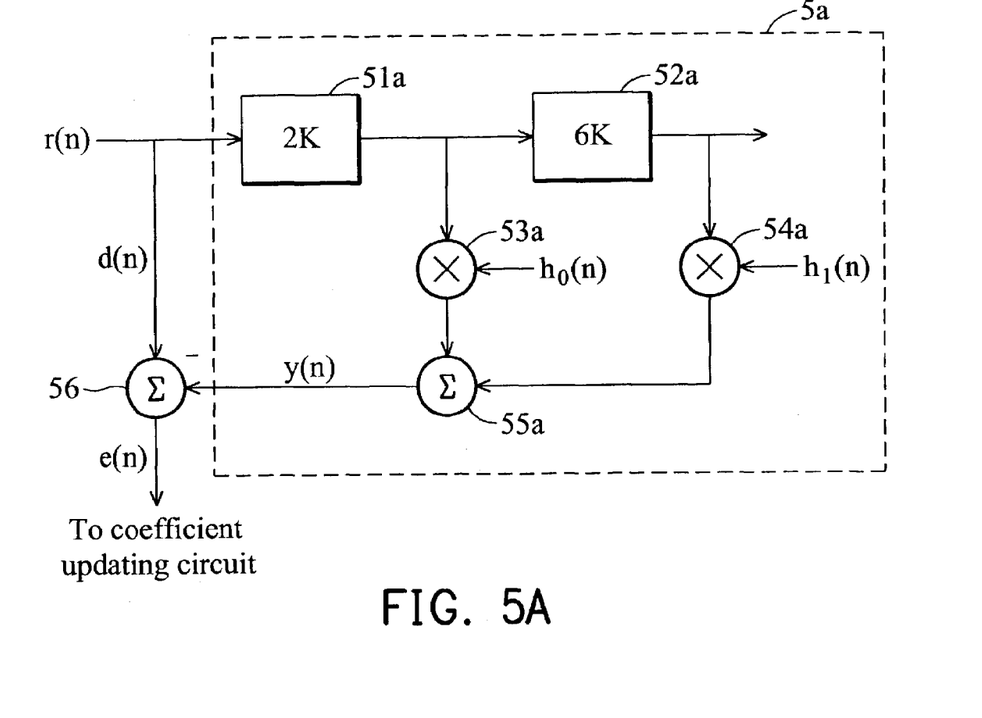
FIGS. 5A and 5B show two embodiments of the system identifiers applied in the present invention.
Figure 5B:
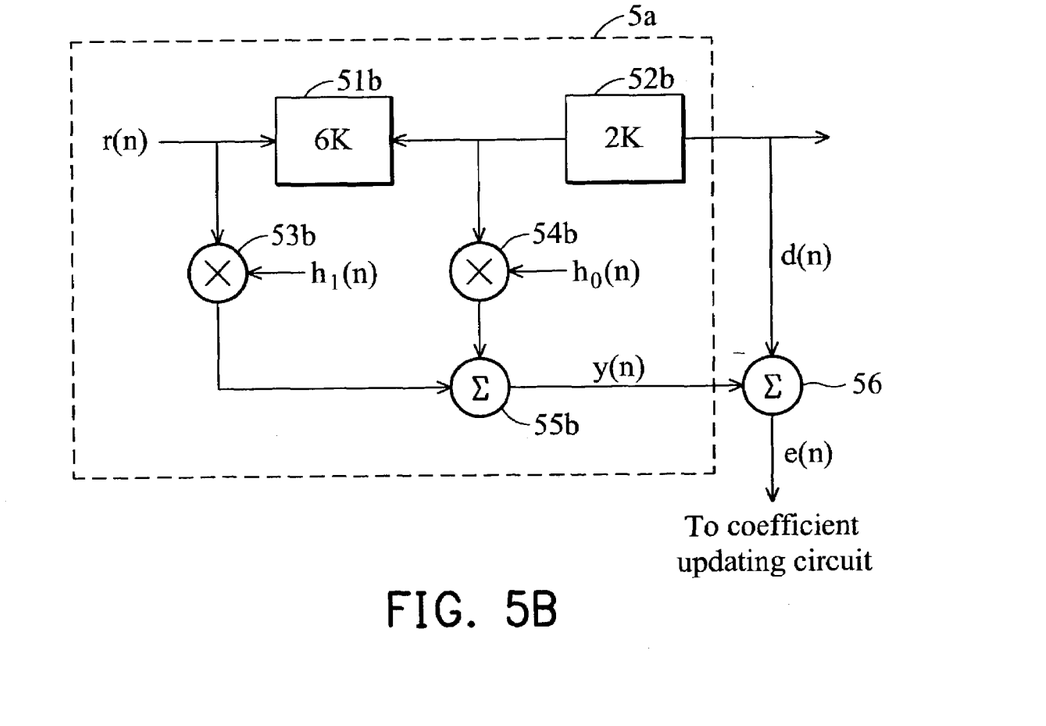

FIGS. 5A and 5B are diagrams showing two system identifiers 5a and 5b according to embodiments of the invention.

The system identifier 5a includes a 2K delay unit 51a delaying the signal r(n) for 2K samples, a 6K delay unit 52a further delaying the signal r(n) for 6K samples, two multipliers 53a and 54a respectively generating products of the signal from the 2K delay unit 51a and $h_0(n)$, and the signal from the 6K delay unit and $h_1(n)$, and an adder 55a outputting the sum y(n) of the two products. The adder 56 subtracts y(n) from d(n) and generates the resultant error signal e(n) fed to a coefficient updating circuit 6 shown in FIG. 6. The coefficient updating circuit 6 feeds back new coefficients $h_0(n+1)$ and $h_1(n+1)$ respectively to the multipliers 53a and 54a.

The system identifier 5b includes a 6K delay unit 51b delaying the signal r(n) for 6K samples, a 2K delay unit 52b further delaying the signal r(n) for 2K samples, two multiplier 53b and 54b respectively generating products of the signal r(n) and $h_1(n)$, and the signal from the 6K delay unit 51b and $h_0(n)$, and an adder 55b outputting the sum y(n) of the two products. The adder 56 subtracts y(n) from d(n) and generates the resultant error signal e(n) fed to the coefficient updating circuit 6 shown in FIG. 6. The coefficient updating circuit 6 feeds back new coefficients $h_0(n+1)$ and $h_1(n+1)$ respectively to the multipliers 54b and 53b.

The filter coefficient $h_0(n)$ detects the 2K mode, and $h_1(n)$ the 8K mode. The least-mean-squared (LMS) algorithm is applied to adaptively adjust the tap coefficients. The update equations for $h_0(n)$ and $h_1(n)$ are listed, $$y(n)=H^H(n)X(n) \quad (1)$$

$$e(n)=d(n)-y(n) \quad (2)$$

$$H(n+1)=H(n)+A(n)X(n)e^*(n) \quad (3)$$

where $H(n)=[h_0(n), h_1(n)]^T$ is the coefficient vector, the superscript T represents transposition and the superscript H of H(n) represents its hermitian form. X(n) represents the input vector corresponding to H(n), y(n) is the output of the adaptive system identifier. The reference signal d(n) is what the identifier output y(n) tries to approach, and their difference, the error signal e(n), can be used to adjust the coefficients. The amount of adjustment is expressed as the correction term on the second term in the right-handed side of equation (3). In the correction term of equation (3), A(n) is a diagonal matrix containing the step sizes $\alpha_0(n)$ and $\alpha_1(n)$ corresponding to the amounts of adjustments of $h_0(n)$ and $h_1(n)$, respectively. The superscript * of e(n) represents its complex conjugate.

The step size $\alpha_i(n)$ (i=0, 1) controls the convergence of the filter coefficients $h_i(n)$, including its convergent rate and the amount of fluctuation after the coefficient converges and enter its steady state. A large step size increases the convergent speed of the coefficient but gives rise to wider fluctuations when the coefficient achieves its steady state. On the contrary, a small step size causes smoother fluctuations in the steady state, but the corresponding coefficient requires more iterations to converge.

Figure 6:
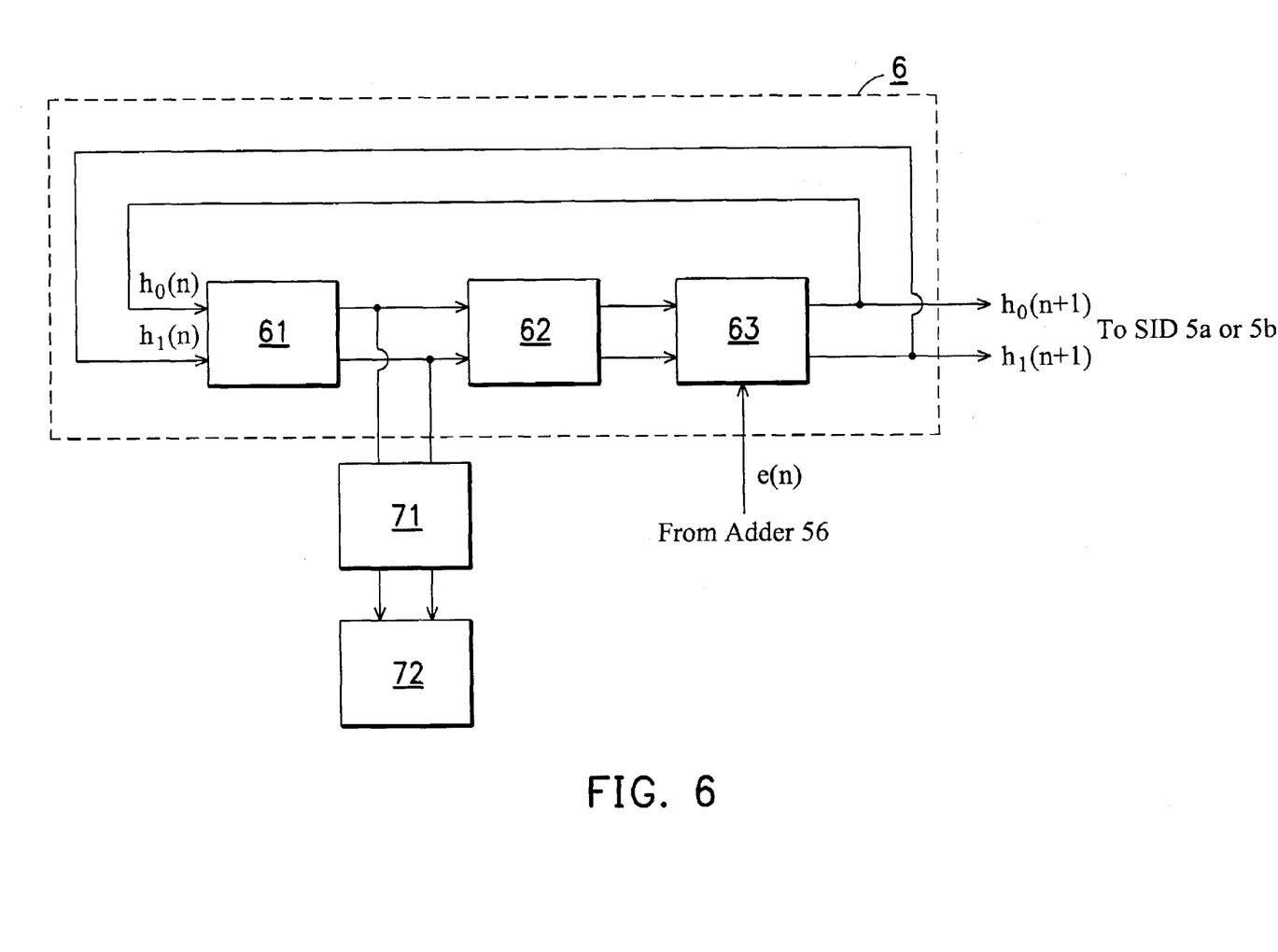
FIG. 6 is a diagram showing the coefficient updating circuit according to one embodiment of the invention.

FIG. 6 is a diagram showing the coefficient updating circuit 6 according to one embodiment of the invention. The coefficient updating circuit 6 includes an amplitude extractor 61, step-size adjustment circuit 62 and a correction term calculator 63. The amplitudes of $h_0(n)$ and $h_1(n)$ are derived by the extractor 61, and sent to the step-size adjustment circuit 62 which accordingly generates the step sizes $\alpha_0(n)$ and $\alpha_1(n)$. The step-size adjustment circuit 62 will be described in detail later. The correction term calculator uses the step sizes $\alpha_0(n)$ and $\alpha_1(n)$ from the step-size adjustment circuit 62, and error signal e(n) from the adder 56 (in FIG. 5A or 5B) to derive the new coefficients $h_0(n+1)$ and $h_1(n+1)$, then fed back to the SID 5a or 5b, and the amplitude extractor 61. The edge detector 71 also receives the amplitudes of $h_0(n)$ and $h_1(n)$ from the extractor 61 to detect the edges of the amplitude curves of $h_0(n)$ and $h_1(n)$. As shown in FIG. 4B, a predetermined threshold TH is required when performing the edge detection. The mode and guard interval discriminator 72 then distinguishes the actual guard interval length in certain mode using the edges detected by the detector 71.

The step-size adjustment circuit 62 is used to sharpen the edges of the amplitude curves of the coefficients $h_0(n)$ and $h_1(n)$ so that the edge detector 71 can unambiguously distinguish the actual guard interval length in certain modes. By the step-size adjustment circuit 62, the coefficients converge quickly in their transient states and fluctuate less in their steady states. The step-size adjustment mechanism is mathematically expressed as follows, If$||h_i(n)|-|h_i(n-N)||>\beta$ $\alpha_i(n+1)=\min\{\alpha_{max}, K\alpha_i(n)\}$ Else $\alpha_i(n+1)=\max\{\alpha_{min}, k\alpha_i(n)\}$ where N represents the time difference, $\beta$ distinguishes whether the corresponding coefficient is in transient or steady state, K is a positive constant larger than 1, k is less than 1 but more than 0, and $\alpha_{max}$ and $\alpha_{min}$ are the boundaries set for $\alpha_i(n)$. These parameters are predetermined. Thus, in brief, the step size becomes larger in the transient state and smaller in the steady state.

Figure 7:
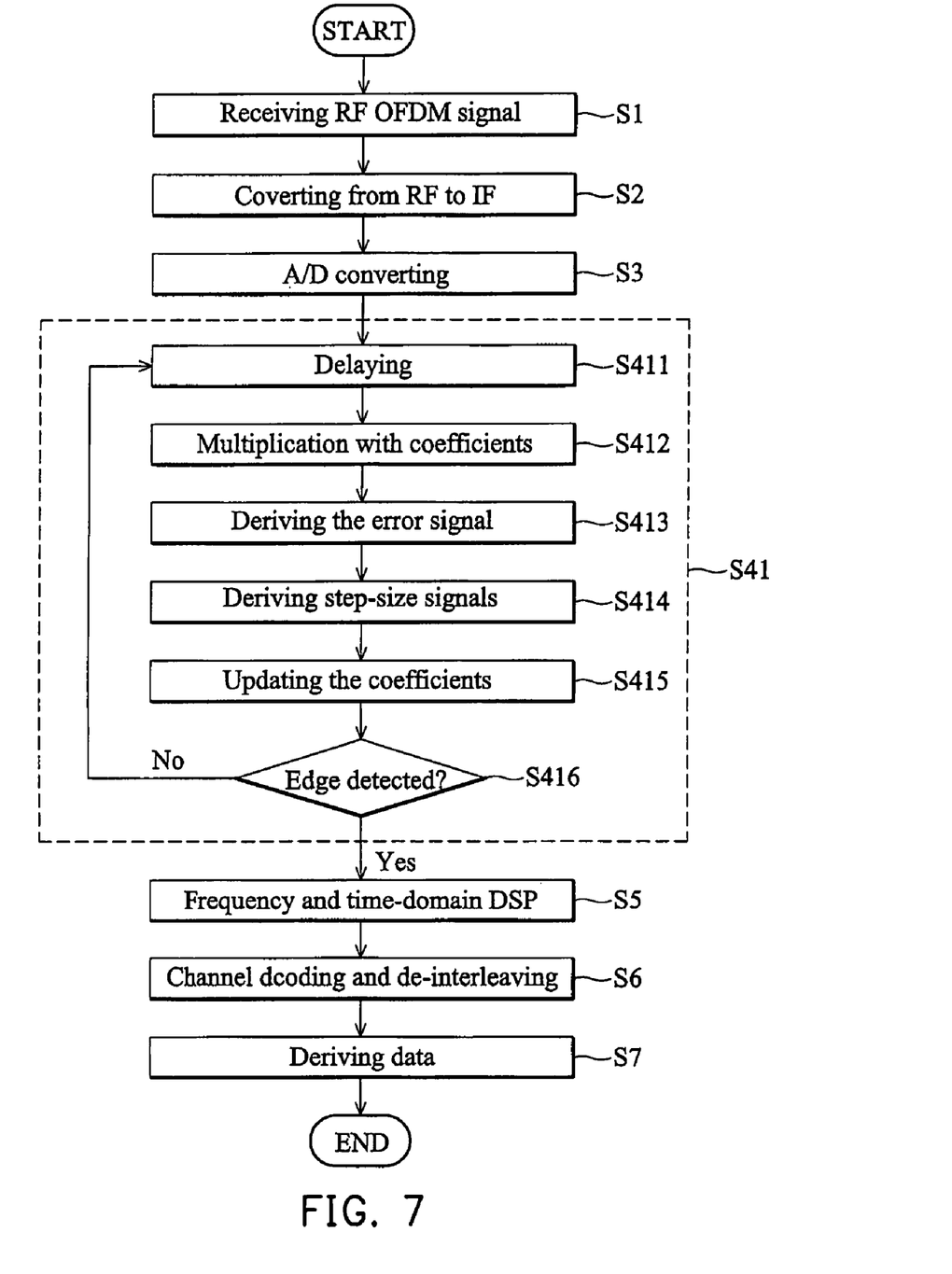
FIG. 7 is a flowchart of a method for processing the OFDM signal received from an OFDM transmitter according to one embodiment of the invention.

FIG. 7 is a flowchart of a method for processing the OFDM signal received from an OFDM transmitter according to one embodiment of the invention.

In step S1, A radio frequency (RF) signal from an OFDM transmitter is received (not shown). The RF signal is an OFDM modulated signal carrying OFDM symbols.

In step S2, the received RF signal is converted in frequency to an intermediate frequency band (IF) signal and amplified.

In step S3, the analog IF signal is converted into a digital signal r(n).

In step S41, mode detection is implemented with the digital signal r(n) for detection of the transmission mode of the OFDM signal.

The mode detection includes the following steps.

In step S411, the signal r(n) is delayed for 2K and 8K samples.

In step S412, the two delayed signals are respectively multiplied with coefficient signals $h_0(n)$ and $h_1(n)$, and the sum y(n) of the two products is derived.

In step S413, the error signal e(n) is derived by subtracting y(n) from r(n).

In step S414, amplitudes of the coefficient signals $h_0(n)$ and $h_1(n)$ are extracted, and step size signals $\alpha_0(n)$ and $\alpha_1(n)$ are derived by the following:

If $||h_i(n)|-|h_i(n-N)|| > \beta$ $\alpha_i(n+1) = \min\{\alpha_{max}, K\alpha_i(n)\}$ Else $\alpha_i(n+1) = \max\{\alpha_{min}, k\alpha_i(n)\}$ where N represents the time difference, $\beta$ distinguishes whether the corresponding coefficient is in transient or steady state, K is a positive constant larger than 1, k is less than 1 but more than 0, and $\alpha_{max}$ and $\alpha_{min}$ are the boundaries set for $\alpha_i(n)$. These parameters are predetermined. Thus, in brief, the step size becomes larger in the transient state and smaller in the steady state.

In step S415, the coefficient signals $h_0(n)$ and $h_1(n)$ are updated according to the error signal e(n) and step size signals $\alpha_0(n)$ and $\alpha_1(n)$.

In step S416, the edges of the amplitudes of the coefficient signals $h_0(n)$ and $h_1(n)$ are detected. The actual guard interval length and transmission mode is determined according to the detected edges. If no useful edge is detected, the steps S411~S415 are iterated.

In step S5, after the mode detection, the digital OFDM signal is digitally processed in time-domain and then in frequency domain. Through the time and frequency domain processing, the OFDM signal is mixed down to baseband signal, synchronized, and with cyclic prefix removed, FFT applied to, and the channels being estimated and equalized.

In step S6, channel decoding and de-interleaving is implemented on the OFDM signal after time and frequency domain digital processing. In a DVB-T transmitter, the generation of the OFDM signal includes steps of transport multiplex adaptation and randomization for energy dispersal, outer coding and outer interleaving, inner coding, inner interleaving, and signal constellations and mapping. Thus, in order to recover the OFDM signal, corresponding inverse steps, channel decoding and de-interleaving, must be implemented at the receiver end.

Finally, in step S7, the data, such as MPEG-2 data, carried on the OFDM signal is derived.

Figure 8:
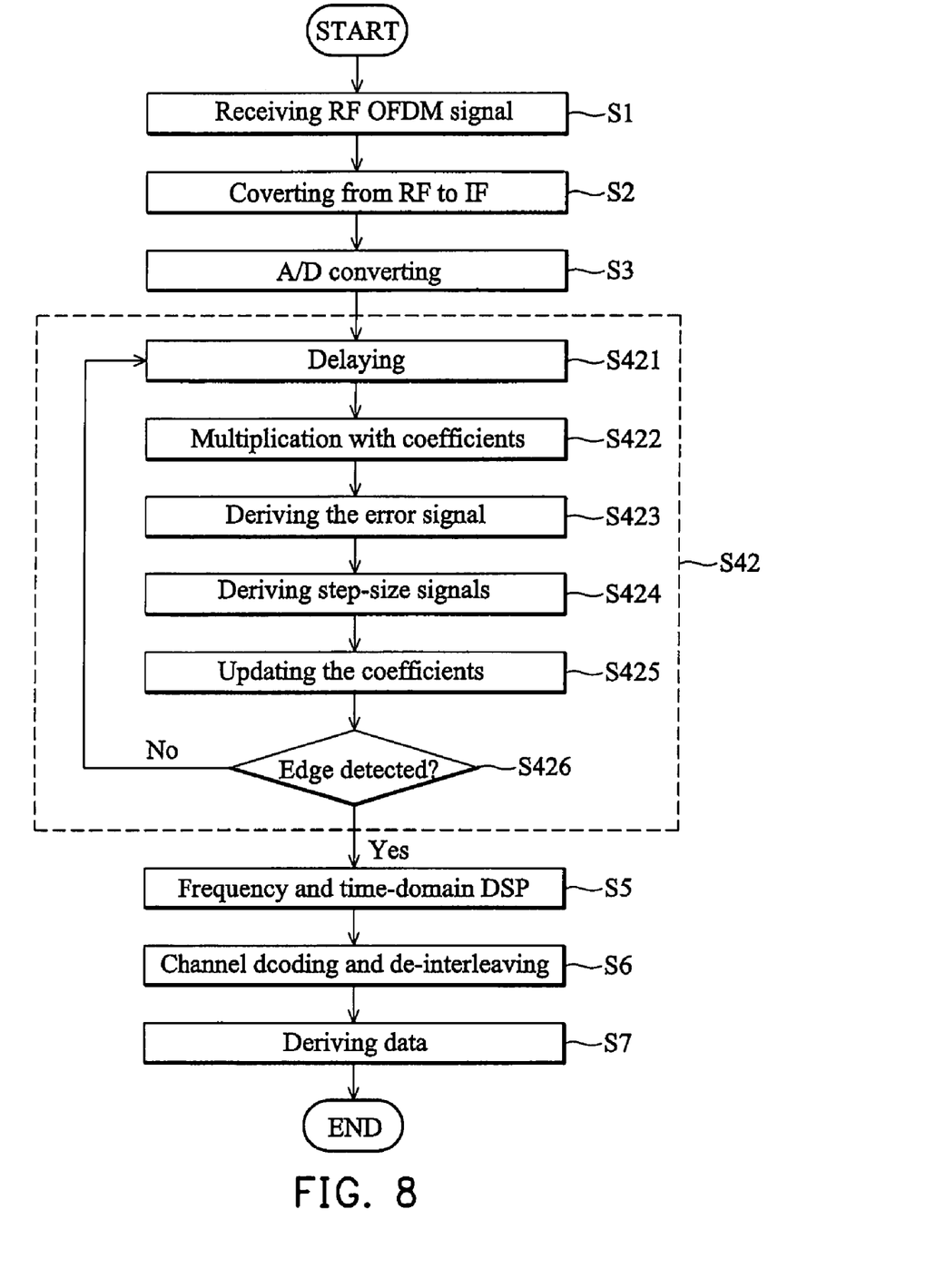
FIG. 8 is a flowchart of a method for processing the OFDM signal received from an OFDM transmitter according to another embodiment of the invention.

FIG. 8 is a flowchart of a method for processing the OFDM signal received from an OFDM transmitter according to another embodiment of the invention.

It is noted that the method shown in FIG. 8 is similar to that in FIG. 7 except for the mode detection step 42.

In step S421, the signal r(n) is delayed for 6K and 8K samples.

In step S422, the original OFDM signal and the signal delayed for 6K samples are respectively multiplied with coefficient signals $h_1(n)$ and $h_0(n)$, and the sum y(n) of the two products is derived.

In step S423, the error signal e(n) is derived by subtracting y(n) from the signal d(n) the OFDM signal delayed for 8K samples.

In step S424, amplitudes of the coefficient signals $h_0(n)$ and $h_1(n)$ are extracted, and step size signals $\alpha_0(n)$ and $\alpha_1(n)$ are derived by the following:

If $||h_i(n)|-|h_i(n-N)|| > \beta$ $\alpha_i(n+1) = \min\{\alpha_{max}, K\alpha_i(n)\}$ Else $\alpha_i(n+1) = \max\{\alpha_{min}, k\alpha_i(n)\}$ where N represents the time difference, $\beta$ distinguishes whether the corresponding coefficient is in transient or steady state, K is a positive constant larger than 1, k is less than 1 but more than 0, and $\alpha_{max}$ and $\alpha_{min}$ are the boundaries set for $\alpha_i(n)$. These parameters are predetermined. Thus, in brief, the step size becomes larger in the transient state and smaller in the steady state.

In step S425, the coefficient signals $h_0(n)$ and $h_1(n)$ is updated according to the error signal e(n) and step size signals $\alpha_0(n)$ and $\alpha_1(n)$.

In step S426, the edges of the amplitudes of the coefficient signals $h_0(n)$ and $h_1(n)$ are detected. The actual guard interval length and transmission mode is determined according to the detected edges. If no useful edge is detected, the steps S421~S425 are iterated.

In conclusion, the present invention provides an OFDM receiver and a method for processing the OFDM signal received from an OFDM transmitter, wherein the transmission mode and guard interval length are detected by applying the concepts of adaptive system identification and edge detection. By examining the interval between two falling edges of amplitude values of the coefficients of the adaptive system identifier, the transmission mode and guard interval length are determined concurrently. Accompanying the adaptive system identifier is a variable step-size mechanism, which yields sharp edges while retaining small coefficient fluctuations.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for processing an RF OFDM signal transmitted from an OFDM transmitter, comprising the steps of:
   receiving and converting the RF OFDM signal into an IF OFDM signal;
   converting the IF OFDM signal into a digital OFDM signal;
   detecting a transmission mode and guard interval length of the OFDM signal, comprising steps of:
   delaying the OFDM signal for a first and second number of samples according to the transmission mode to be detected;
   multiplying the two delayed signals by coefficient signals, and deriving a sum of the two products;
   deriving an error signal by subtracting the sum of the two products from the OFDM signal;
   extracting amplitudes of the coefficient signals, and accordingly deriving step size signals for controlling a convergent rate and an amount of fluctuation of the coefficient signals;
   updating the coefficient signals according to the error signal and step size signals with least-mean-squared (LMS) algorithm;
   detecting edges of the amplitudes of the coefficient signals; and
   determining the guard interval length and transmission mode according to the detected edges;

implementing digital processing of the OFDM signal in time domain and frequency domain; and implementing channel decoding and de-interleaving of the OFDM signal.

2. The method as claimed in claim 1, wherein the first and second numbers are 2K and 8K respectively.

3. The method as claimed in claim 1, wherein the step size signals are $\alpha_0(n)$ and $\alpha_1(n)$, derived by an equation:

If $\|h_i(n)| - |h_i(n-N)\| > \beta$ $\alpha_i(n+1) = \min\{\alpha_{\max}, K\alpha_i(n)\}$ Else $\alpha_i(n+1) = \max\{\alpha_{\min}, k\alpha_i(n)\}$ where N is a predetermined time difference, $\beta$ is a predetermined value, K is a predetermined positive constant larger than 1, k is a predetermined positive constant less than 1 but more than 0, and $\alpha_{max}$ and $\alpha_{min}$ are boundaries set for $\alpha_i(n)$.

4. A method of mode detection for OFDM signals comprising the steps of:

delaying the OFDM signal for a first and second number of samples according to the transmission mode to be detected;

multiplying the two delayed signals by coefficient signals, and deriving a sum of the two products;

deriving an error signal by subtracting the sum of the two products from the OFDM signal;

extracting amplitudes of the coefficient signals, and accordingly deriving step size signals for controlling a convergent rate and an amount of fluctuation of the coefficient signals;

updating the coefficient signals according to the error signal and step size signals with least-mean-squared (LMS) algorithm;

detecting edges of the amplitudes of the coefficient signals; and determining the guard interval length and transmission mode according to the detected edges.

5. The method as claimed in claim 4, wherein the first and second numbers are 2K and 8K respectively.

6. The method as claimed in claim 4, wherein the step size signals are $\alpha_0(n)$ and $\alpha_1(n)$, derived by an equation:

$$w(t) = \begin{cases} 0.5 + 0.5\cos(\pi + \pi t/(\beta T_r)), & 0 \le t \le \beta T_r \\ 1.0, & \beta T_s \le t \le T_r \\ 0.5 + 0.5\cos((t - T_r)\pi/\beta T_r)), & T_s \le t \le (1+\beta)T_r \end{cases}$$

where N is a predetermined time difference, $\beta$ is a predetermined value, K is a predetermined positive constant larger than 1, k is a predetermined positive constant less than 1 but more than 0, and $\alpha_{max}$ and $\alpha_{min}$ are boundaries set for $\alpha_i(n)$.

7. An OFDM receiver comprising:

a front end receiving and converting the RF OFDM signal into an IF OFDM signal;

an A/D converter converting the IF OFDM signal into a digital OFDM signal;

a mode detector detecting a transmission mode and guard interval length of the OFDM signal, which comprises:

delay units delaying the OFDM signal for a first and second number of samples according to the transmission mode to be detected;

multipliers multiplying the two delayed signals by coefficient signals;

a first adder deriving a sum of the two products from the multipliers;

a second adder deriving an error signal by subtracting the sum of the two products from the OFDM signal;

an amplitude extractor extracting amplitudes of the coefficient signals;

a step-size adjustment circuit generating step size signals for controlling a convergent rate and an amount of fluctuation of the coefficient signals according to the amplitudes from the amplitude extractor;

a correction term calculator updating the coefficient signals according to the error signal and step size signals with least-mean-squared (LMS) algorithm;

an edge detector detecting edges of the amplitudes of the coefficient signals; and a discriminator determining the guard interval length and transmission mode according to the detected edges;

frequency and time domain digital processors implementing digital processing of the OFDM signal in time domain and frequency domain; and a channel decoder and de-interleaver implementing channel decoding and de-interleaving of the OFDM signal.

8. The OFDM receiver as claimed in claim 7, wherein the first and second numbers are 2K and 8K respectively.

9. The OFDM receiver as claimed in claim 7, wherein the step size signals are $\alpha_0(n)$ and $\alpha_1(n)$, derived by an equation:

If $\|h_i(n)| - |h_i(n-N)\| > \beta$ $\alpha_i(n+1) = \min\{\alpha_{\max}, K\alpha_i(n)\}$ Else $\alpha_i(n+1) = \max\{\alpha_{\min}, k\alpha_i(n)\}$ where N is a predetermined time difference, $\beta$ is a predetermined value, K is a predetermined positive constant larger than 1, k is a predetermined positive constant less than 1 but more than 0, and $\alpha_{max}$ and $\alpha_{min}$ are boundaries set for $\alpha_i(n)$.

10. A mode detector in an OFDM receiver comprising:

delay units delaying the OFDM signal for a first and second number of samples according to the transmission mode to be detected;

multipliers multiplying the two delayed signals by coefficient signals;

a first adder deriving a sum of the two products from the multipliers;

a second adder deriving an error signal by subtracting the sum of the two products from the OFDM signal;

an amplitude extractor extracting amplitudes of the coefficient signals;

a step-size adjustment circuit generating step size signals for controlling a convergent rate and an amount of fluctuation of the coefficient signals according to the amplitudes from the amplitude extractor;

a correction term calculator updating the coefficient signals according to the error signal and step size signals with least-mean-squared (LMS) algorithm;

an edge detector detecting edges of the amplitudes of the coefficient signals; and a discriminator determining the guard interval length and transmission mode according to the detected edges.

11. The mode detector as claimed in claim 10, wherein the first and second numbers are 2K and 8K respectively.

12. The mode detector as claimed in claim 10, wherein the step size signals are $\alpha_0(n)$ and $\alpha_1(n)$, derived by an equation:

If $\||h_i(n)| - |h_i(n-N)|\| > \beta$ $\alpha_i(n+1) = \min\{\alpha_{max}, K\alpha_i(n)\}$ Else $\alpha_i(n+1) = \max\{\alpha_{min}, k\alpha_i(n)\}$ where N is a predetermined time difference, $\beta$ is a predetermined value, K is a predetermined positive constant larger than 1, k is a predetermined positive constant less than 1 but more than 0, and $\alpha_{max}$ and $\alpha_{min}$ are boundaries set for $\alpha_i(n)$.

* * * * *